(12) United States Patent
Chang

(10) Patent No.: US 10,129,382 B2
(45) Date of Patent: Nov. 13, 2018

(54) ELECTRONIC DEVICE AND METHOD FOR CONTROLLING ELECTRONIC DEVICE USING HEADSET

(71) Applicant: FIH (HONG KONG) LIMITED, Kowloon (HK)

(72) Inventor: Chih-Hao Chang, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 509 days.

(21) Appl. No.: 14/840,286

(22) Filed: Aug. 31, 2015

(65) Prior Publication Data

US 2016/0165035 A1     Jun. 9, 2016

(30) Foreign Application Priority Data

Dec. 3, 2014 (TW) .............................. 103146316 A

(51) Int. Cl.
| | |
|---|---|
| *H04M 1/725* | (2006.01) |
| *H04M 1/60* | (2006.01) |
| *H04W 4/00* | (2018.01) |
| *H04W 4/70* | (2018.01) |

(52) U.S. Cl.
CPC ..... *H04M 1/72527* (2013.01); *H04M 1/6058* (2013.01); *H04W 4/70* (2018.02); *H04M 1/72558* (2013.01); *H04M 2250/12* (2013.01)

(58) Field of Classification Search
CPC .......... H04M 1/72527; H04M 1/6058; H04M 1/72558; H04M 2250/12; H04W 4/005
See application file for complete search history.

(56) References Cited

U.S. PATENT DOCUMENTS

| | | | | |
|---|---|---|---|---|
| RE44,980 E | * | 7/2014 | Sargaison ........... | H04M 1/6058 381/1 |
| 2004/0136522 A1 | * | 7/2004 | Wurtz ................. | H04M 1/6058 379/430 |
| 2006/0165243 A1 | * | 7/2006 | Lee ..................... | H04M 1/6066 381/74 |
| 2006/0262949 A1 | * | 11/2006 | Cho ........................ | H04M 1/05 381/309 |

* cited by examiner

*Primary Examiner* — Joseph Dean, Jr.
(74) *Attorney, Agent, or Firm* — ScienBiziP, P.C.

(57) ABSTRACT

An electronic device receives a first distance signal from a sensor embraced by a left receiver of a headset, and a second distance signal from a sensor embraced by a right receiver of the headset. The electronic device obtains a first distance between the left receiver and a left ear of the person according to the first distance signal, and obtains a second distance between the right receiver and a right ear of the person according to the second distance signal. The electronic device executes a specific operation according to the first distance and the second distance.

18 Claims, 4 Drawing Sheets

ELECTRONIC DEVICE AND METHOD FOR CONTROLLING ELECTRONIC DEVICE USING HEADSET

CROSS-REFERENCE TO RELATED APPLICATIONS

This application claims priority to Taiwanese Patent Application No. 103146316 filed on Dec. 30, 2014, the contents of which are incorporated by reference herein.

FIELD

The subject matter herein generally relates to headset technology, and particularly to an electronic device and a method for controlling the electronic device using a headset.

BACKGROUND

Electronic devices (for example, a mobile phone, or a music player) use a headset for executing a specific operation, for example, answering a call or listening music. However, the headset manually control the electronic device, for example, a button of the headset is pressed by a user to play music. That is, the electronic device cannot be automatically controlled by the headset. For example, the headset is away from the user, the headset cannot stop playing music for saving power of the electronic device.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
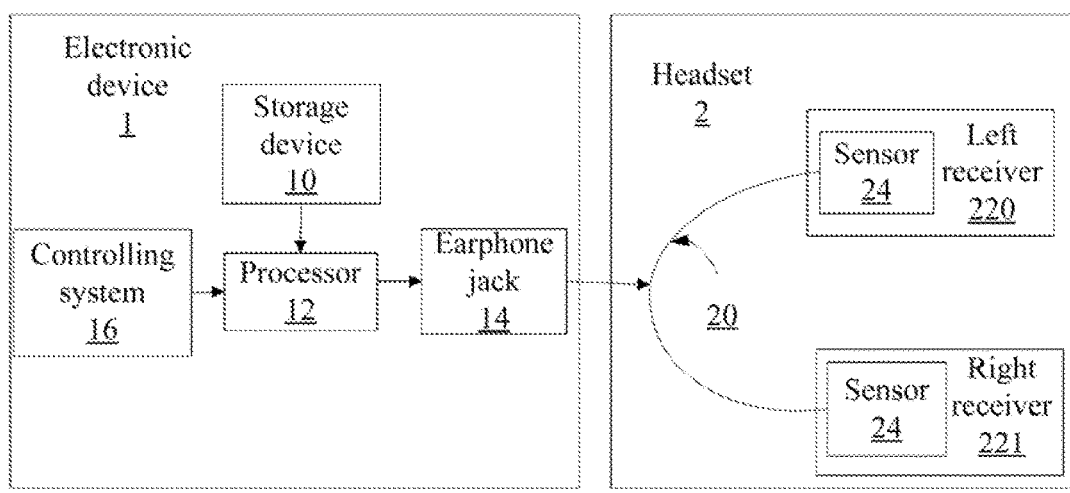
FIG. 1 is a diagrammatic view of an exemplary embodiment of an electronic device connected to a headset.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable median include CDs, DVDs, BLU-RAY™, flash memory, and hard disk drives. The term "comprising" means "including, but not necessarily limited to"; it specifically indicates open-ended inclusion or membership in a so-described combination, group, series and the like.

FIG. 1 is a diagrammatic view of an exemplary embodiment of an electronic device 1 connected to a headset 2. The electronic device 1 includes, but is not limited to, a storage device 10, at least one processor 12, an earphone jack 14, and a controlling system 16. The electronic device 1 can be, but is not limited to, a mobile phone, a tablet computer, a personal digital assistant (PDA), a personal computer or any other electronic devices. FIG. 1 illustrates only one example of the electronic device 1, and other examples can comprise more or fewer components that those shown in the embodiment, or have a different configuration of the various components.

In at least one embodiment, the headset 2 includes, but is not limited to, a wire 20, a left receiver 220, a right receiver 221, and two sensors 24 provided for the left receiver 220 and the right receiver 221, for example, one of the two sensors 24 is embedded into the left receiver 220, one of the two sensors 24 is embedded into the right receiver 221. The wire 20 includes an earphone plug at one end of the wire 24. The electronic device 1 is connected to the headset 2 using the earphone jack 14 and the wire 20, for example, when the earphone plug of the wire 20 is plugged into the earphone jack 14. The sensors 24 can detect a distance between the receivers (for example, the right receiver 220, or the left receiver 221) and an obstacle (for example, an ear of a user). In at least one embodiment, the sensors 24 transmit light pluses to surround environment and receives reflected light pluses from the obstacle, and measures an interval between the transmitted light pluses and the reflected light pluses, so that the distance between the sensors and the obstacle is measured according to the measured interval and a speed of the light pluses. In addition, if the measured interval is less than or equal to a predetermined value (for example, 0.0001 second), the distance between the between the sensors and the obstacle is regarded as zero, and the sensors 24 determines that the receivers are plugged into the ears of the user. The sensors 24 can be, but are not limited to, proximity sensors. Furthermore, the sensors 24 detect if the earphone plug of the wire 20 is plugged into the earphone jack 14.

In at least one embodiment, the storage device 10 can be an internal storage device, such as a flash memory, a random access memory (RAM) for temporary storage of parameters, and/or a read-only memory (ROM) for permanent storage of parameters. The storage device 10 can also be an external storage device, such as an external hard disk, a storage card, or a data storage medium. The at least one processor 16 can be a central processing unit (CPU), a microprocessor, or other data processor chip that performs functions of the electronic device 1.

Figure 2:
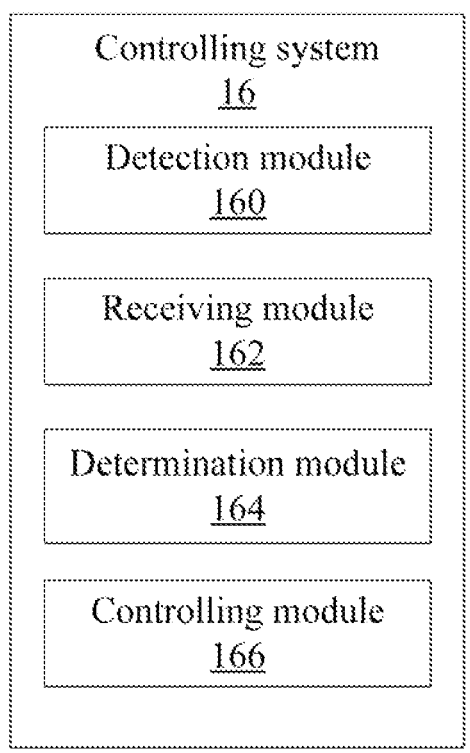
FIG. 2 a block diagram of an exemplary embodiment of a controlling system included in the electronic device.

FIG. 2 is a block diagram of one embodiment of the controlling system 16. The controlling system 16 comprises, but is not limited to, a detection module 160, a receiving module 162, a determination module 164, and a controlling module 166. Modules 160-166 can comprise computerized instructions in the form of one or more computer-readable programs that can be stored in a non-transitory computer-readable medium, for example the storage device 10, and executed by the at least one processor 16 of the electronic device 1. A detailed description of the functions of the modules 160-166 is given below in reference to FIGS. 3-4.

Figure 3:
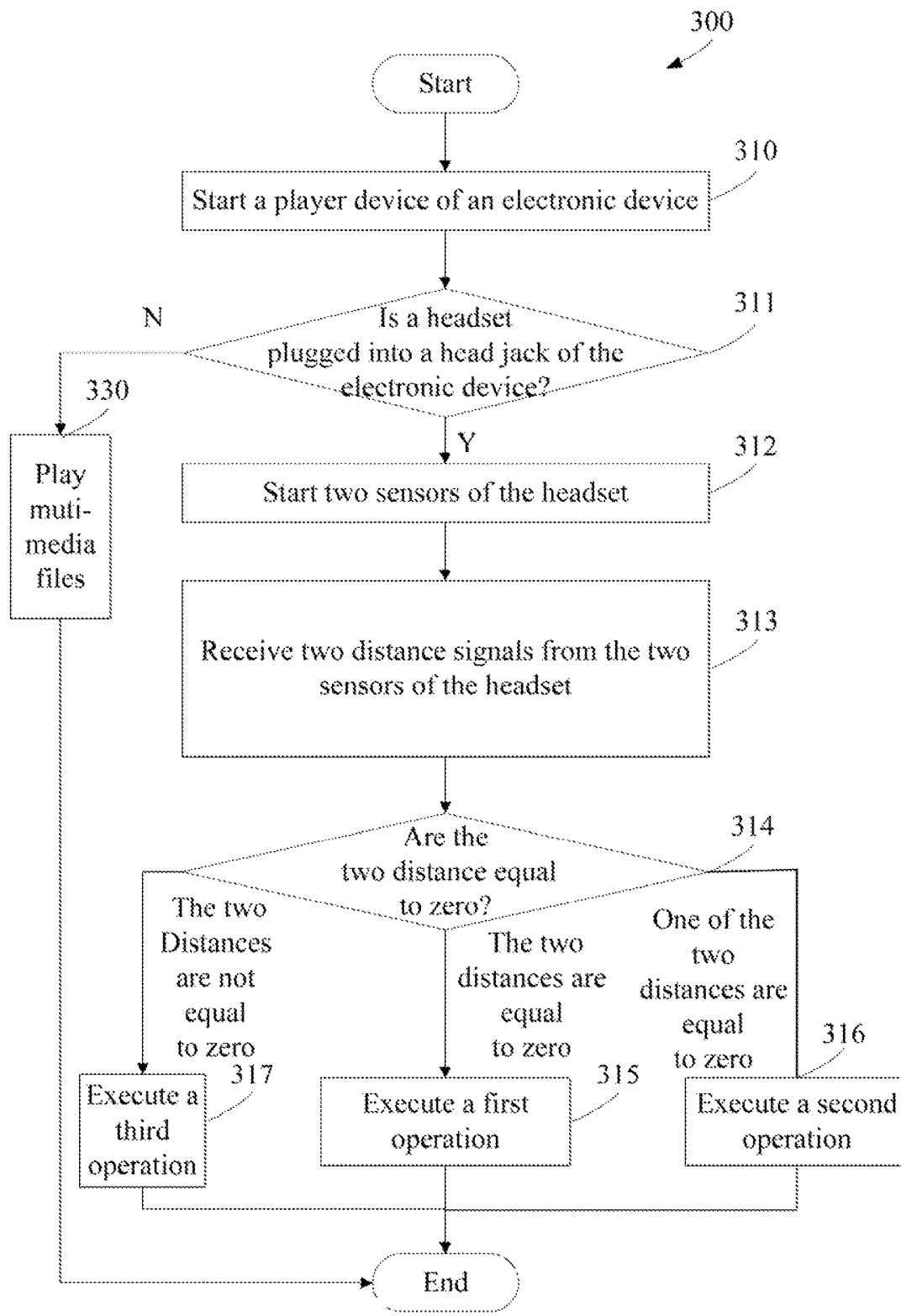
FIG. 3 is a flowchart of a first exemplary embodiment of a method for controlling the electronic device using the headset.

FIG. 3 is a flowchart of a first exemplary embodiment of a method for controlling the electronic device 1 using the headset 2. In an example embodiment, the method is performed by execution of computer-readable software program codes or instructions by at least one processor of the electronic device.

Referring to FIG. 3, a flowchart is presented in accordance with an example embodiment. The method 300 is provided by way of example, as there are a variety of ways to carry out the method. The method 300 described below can be carried out using the configurations illustrated in FIGS. 1-3, for example, and various elements of these figures are referenced in explaining method 300. Each block shown in FIG. 3 represents one or more processes, methods, or subroutines, carried out in the method 300. Furthermore, the illustrated order of blocks is illustrative only and the order of the blocks can be changed. Additional blocks can be added or fewer blocks can be utilized without departing from this disclosure. The example method 300 can begin at block 310.

At block 310, a player of the electronic device is started. In at least one embodiment, the player can be, but is not limited to, an audio device, a video device or the combined. The player of the electronic device can be started via various way, for example, the user presses a button installed on the electronic device to start the player, or the user speaks a specific voice (for example, "start player") to start the player.

At block 311, the detection module detects if the headset is connected to the electronic device. In at least one embodiment, the headset is connected to the electronic device upon a condition that the earphone plug of the headset is plugged into the earphone jack of the electronic device. In detail, a voltage of the earphone jack of the electronic device exceeds a predetermined value (for example, five volt) when the earphone plug of the headset is plugged into the earphone jack of the electronic device. If the voltage of the earphone jack of the electronic device 1 does not exceed the predetermined value, the headset is determined to be connected to the electronic device, and the procedure goes to block 330, the player of the electronic device plays multi-media files (for example, an audio file, a video file or the combined) when the button (for example, a "play" button) is pressed by the user. If the voltage of the earphone jack of the electronic exceeds the predetermined value, the headset is determined to be disconnected to the electronic device, the procedure goes to block 312.

At block 312, the detection module starts the two sensors of the headset. In at least one embodiment, the detection module starts the two sensors of the headset within a predetermined time (for example, three seconds) when the headset is connected to the electronic device. For example, after three seconds elapses when the headset is connected to the electronic device, the two sensors of the headset are started by the detection module.

At block 313, the receiving module receives two distance signals from the two sensors. The two distance signals include a left distance signal and a right distance signal. The receiving module receives the left distance signal from the left receiver, and receives the right distance signal from the right receiver. The left distance signal includes a value which indicates a first distance between the left receiver and a left ear of the person. For example, the left distance signal includes the value "zero" which indicates the first distance is equal to zero. The left distance signal is generated by the sensor of the left receiver. The right distance signal includes a value which indicates a second distance between the right receiver and a right ear of the person. For example, the right distance signal includes the value "zero" which indicates the second distance is equal to zero. The right distance signal is generated by the sensor of the right receiver.

At block 314, the determination module determines if the first distance and the second distance are equal to zero according to the two distance signals. In at least one embodiment, if the left distance signal includes the value "zero", the first distance is equal to zero. If the right distance signal includes the value "zero", the second distance is equal to zero. If both the first distance and the second distance are equal to zero, the procedure goes to block 315. If one of the first distance and the second distance is equal to zero, the procedure returns to block 316. If the first distance and the second distance are not equal to zero, the procedure goes to block 317.

At block 315, the controlling module executes a first operation. The first operation can refer to, but not limited to, automatically playing the multi-media files.

At block 316, the controlling module executes a second operation. The second operation can refer to, but not limited to, turning up a volume of the receiver to a predetermined volume. For example, if the first distance is not equal to zero, and the second distance is equal to zero, the controlling module turns up a volume of the left receiver to the predetermined volume. If the first distance is equal to zero, and the second distance is not equal to zero, the controlling module turns up a volume of the right receiver to the predetermined volume.

At block 317, the controlling module executes a third operation. The third operation can refer to, but not limited to, stopping playing the multi-media files or shutting down the player of the electronic device. After the third operation is executed, the controlling module turns off the sensors to save power of the headset.

Figure 4:
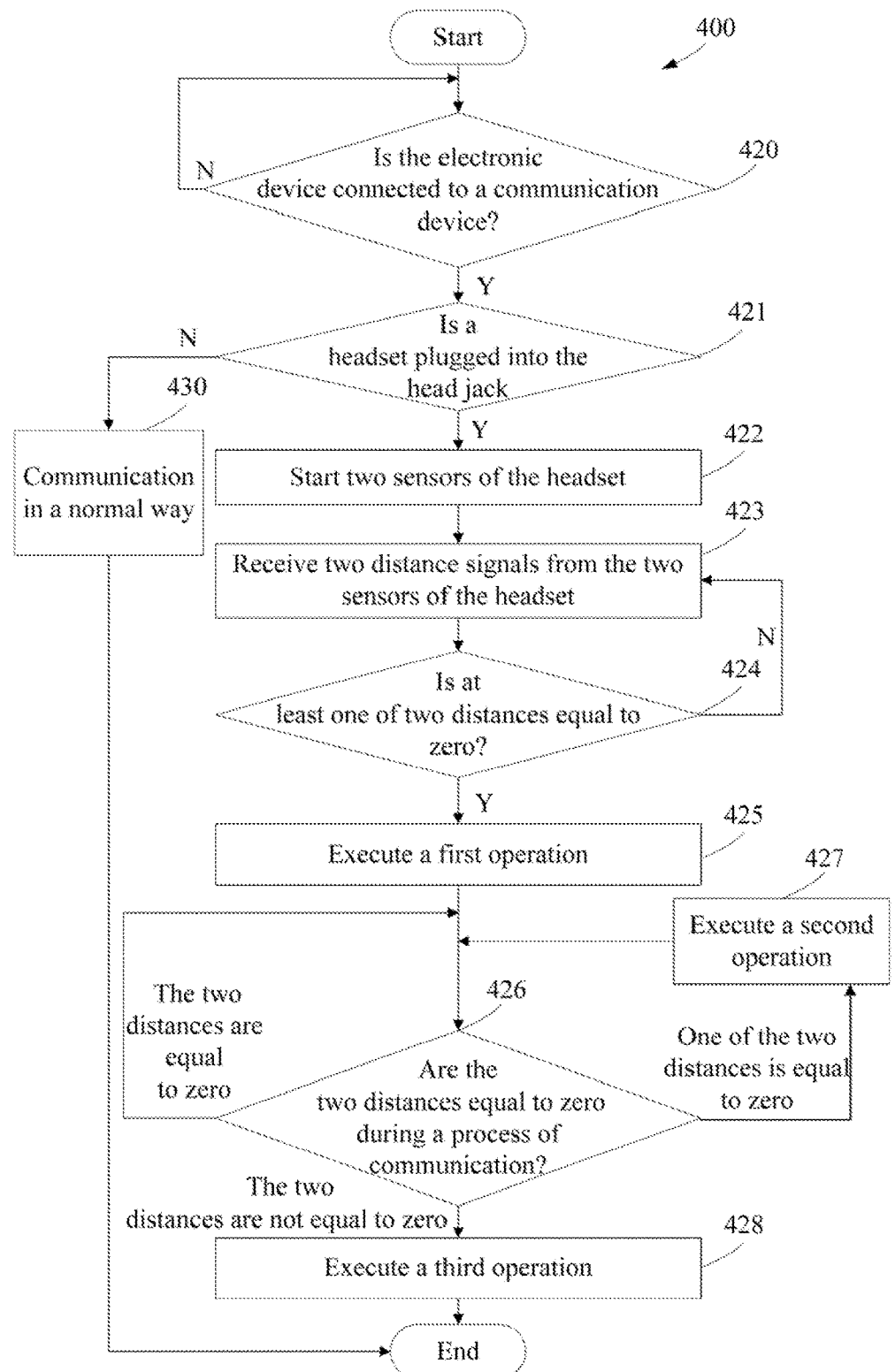
FIG. 4 is a flowchart of a second exemplary embodiment of a method for controlling the electronic device using the headset.

FIG. 4 is a flowchart of a second exemplary embodiment of a method for controlling the electronic device using the headset. In an example embodiment, the method is performed by execution of computer-readable software program codes or instructions by at least one processor of the electronic device.

Referring to FIG. 4, a flowchart is presented in accordance with an example embodiment. The method 400 is provided by way of example, as there are a variety of ways to carry out the method. The method 400 described below can be carried out using the configurations illustrated in FIGS. 1-2 and 4, for example, and various elements of these figures are referenced in explaining method 400. Each block shown in FIG. 4 represents one or more processes, methods, or subroutines, carried out in the method 400. Furthermore, the illustrated order of blocks is illustrative only and the order of the blocks can be changed. Additional blocks can be added or fewer blocks can be utilized without departing from this disclosure. The example method 400 can begin at block 420.

At block 420, the detection module detects if the electronic device is connected to a communication device. The communication device can be, but is not limited to, a mobile phone, a tablet computer, a personal digital assistant (PDA), a personal computer or any other electronic devices. In at least one embodiment, the electronic device is connected to the communication device when the electronic device can transmit communication signals to the communication device, or the electronic device can receive the communication signals from the communication device. If the electronic device is disconnected to any other communication device, block 420 is repeatedly executed until the electronic device is in communication with the communication device. If the electronic device is connected to the communication device, the procedure goes to block 421.

At block 421, the detection module detects if the headset is connected to the electronic device. In at least one embodiment, the headset is connected to the electronic device upon the condition that the earphone plug of the headset is plugged into the earphone jack of the electronic device. In detail, the voltage of the earphone jack of the electronic exceeds the predetermined value (for example, five volt) when the earphone plug of the headset is plugged into the earphone jack of the electronic device. If the voltage of the earphone jack of the electronic does not exceed the predetermined value, the headset is determined to be connected to the electronic device, and the procedure goes to block 430, the electronic device communicates with the communication device using a normal way. The normal way can be that the electronic device is triggered by the user to communicate with the communication device, for example, a telephone phone of the communication device is generated by pressing number keys of the electronic device, so that the electronic device communicates with the communication device using the telephone number. If the voltage of the earphone jack of the electronic exceeds the predetermined value, the headset is determined to be disconnected to the electronic device, the procedure goes to block 422.

At block 422, the detection module starts the two sensors of the headset. In at least one embodiment, the detection module starts the two sensors of the headset within the predetermined time (for example, three seconds) when the headset is connected to the electronic device. For example, after three seconds elapses when the headset is connected to the electronic device, the two sensors of the headset are started by the detection module.

At block 423, the receiving module receives two distance signals from the two sensors. The two distance signals include a left distance signal and a right distance signal. The receiving module receives the left distance signal from the left receiver, and receives the right distance signal from the right receiver. The left distance signal includes a value which indicates a first distance between the left receiver and a left ear of the person. For example, the left distance signal includes the value "zero" which indicates the first distance is equal to zero. The left distance signal is generated by the sensor of the left receiver. The right distance signal includes a value which indicates a second distance between the right receiver and a right ear of the person. For example, the right distance signal includes the value "zero" which indicates the second distance is equal to zero. The right distance signal is generated by the sensor of the right receiver.

At block 424, the determination module determines if at least one of the first distance and the second distance is equal to zero according to the two distance signals. In at least one embodiment, if none of the first distance and the second distance is equal to zero, the procedure returns to block 423. If at least one of the first distance and the second distance is equal to zero, the procedure goes to block 425.

At block 425, the controlling module executes a first operation. The first operation can refer to, but not limited to, the electronic device automatically starts communication function, for example, the electronic device automatically calls the communication device, or the electronic device automatically transmits data to the communication device. After the first operation, the electronic device is in a process of communication with the communication device.

At block 426, the determination module obtains the two distance signals and determines if the two distances are equal to zero during a process of communication. If the first distance and the second distance are equal to zero, block 426 is repeatedly executed. If one of the first distance and the second distance is equal to zero, for example, the first distance is equal to zero and the second distance is not equal to zero, the procedure returns to block 427. If the first distance and the second distance are not equal to zero, the procedure goes to block 428.

At block 427, the controlling module executes a second operation. The second operation can refer to, but not limited to, turning up a volume of the receiver to the predetermined volume. For example, if the first distance is not equal to zero, and the second distance is equal to zero, the controlling module turns up a volume of the left receiver to the predetermined volume. If the first distance is equal to zero, and the second distance is not equal to zero, the controlling module turns up a volume of the right receiver to the predetermined volume.

At block 428, the controlling module executes a third operation. The third operation can refer to, but not limited to, stopping communication with the communication device or automatically turning on a speaker of the electronic device. After the third operation is executed, the controlling module turns off the sensors to save power of the headset.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including the full extent established by the broad general meaning of the terms used in the claims.

What is claimed is:

1. An electronic device comprising:
   at least one processor;
   an earphone jack coupled to the at least one processor and configured to receive a plug of a headset;
   a storage device coupled to the at least one processor and configured to store one or more programs, which when executed by the at least one processor, cause the at least one processor to:
   start two sensors of the headset when the headset is plugged into the earphone jack, wherein each of the sensors transmits light pulses to surrounding environment and receives reflected light pulses from an obstacle, measuring an interval between the transmitted light pulses and the reflected light pulses, and measuring a distance between the sensor and the obstacle according to the measured interval and a speed of the light pulses;
   receive a first distance signal from a sensor located within a left receiver of the headset;

receive a second distance signal from a sensor located within a right receiver of the headset;

obtain a first distance between the left receiver and a left ear of the person according to the first distance signal;

obtain a second distance between the right receiver and a right ear of the person according to the second distance signal; and execute a specific operation of the electronic device according to the first distance and the second distance.

2. The electronic device of claim 1, wherein the left distance signal comprises a value which indicates the first distance between the left receiver and the left ear of the person, and the right distance signal comprises a value which indicates the second distance between the right receiver and the right ear of the person.

3. The electronic device of claim 1, wherein the specific operation comprises a first operation, a second operation and a third operation.

4. The electronic device of claim 3, wherein the first operation is executed when the first distance and the second distance are equal to zero, the first operation is that the electronic device plays the multi-media files, or the electronic device starts communication function.

5. The electronic device of claim 3, wherein the second operation is executed when one of the first distance and the second distance is equal to zero, the second operation is that the electronic device turns up a volume of the left receiver to a predetermined volume when the first distance is equal to zero, and turns up a volume of the right receiver to the predetermined volume when the second distance is equal to zero.

6. The electronic device of claim 3, wherein the third operation is executed when the first distance and the second distance are not equal to zero, the third operation is that the electronic device is shut down or the electronic device turns on a speaker of the electronic device.

7. A computer-based method for controlling an electronic device using a headset, the method comprising:

starting two sensors of the headset when the headset is plugged into the earphone jack, wherein each of the sensors transmits light pulses to surrounding environment and receives reflected light pulses from an obstacle, measuring an interval between the transmitted light pulses and the reflected light pulses, and measuring a distance between the sensor and the obstacle according to the measured interval and a speed of the light pulses;

receiving a first distance signal from a sensor located within a left receiver of the headset;

receiving a second distance signal from a sensor located within a right receiver of the headset;

obtaining a first distance between the left receiver and a left ear of the person according to the first distance signal;

obtaining a second distance between the right receiver and a right ear of the person according to the second distance signal; and executing a specific operation of the electronic device according to the first distance and the second distance.

8. The method of claim 7, wherein the left distance signal comprises a value which indicates the first distance between the left receiver and the left ear of the person, and the right distance signal comprises a value which indicates the second distance between the right receiver and the right ear of the person.

9. The method of claim 7, wherein the specific operation comprises a first operation, a second operation and a third operation.

10. The method claim 9, wherein the first operation is executed when the first distance and the second distance are equal to zero, the first operation is that the electronic device plays the multi-media files, or the electronic device starts communication function.

11. The method of claim 9, wherein the second operation is executed when one of the first distance and the second distance is equal to zero, the second operation is that the electronic device turns up a volume of the left receiver to a predetermined volume when the first distance is equal to zero, and turns up a volume of the right receiver to the predetermined volume when the second distance is equal to zero.

12. The method of claim 9, wherein the third operation is executed when the first distance and the second distance are not equal to zero, the third operation is that the electronic device is shut down or the electronic device turns on a speaker of the electronic device.

13. A non-transitory computer-readable medium having stored thereon instructions that, when executed by at least one processor of an electronic device, causing the processor to perform a method for controlling the electronic device using a headset, the method comprising:

starting two sensors of the headset when the headset is plugged into the earphone jack, wherein each of the sensors transmits light pulses to surrounding environment and receives reflected light pulses from an obstacle, measuring an interval between the transmitted light pulses and the reflected light pulses, and measuring a distance between the sensor and the obstacle according to the measured interval and a speed of the light pulses;

receiving a first distance signal from a sensor located within a left receiver of the headset;

receiving a second distance signal from a sensor located within a right receiver of the headset;

obtaining a first distance between the left receiver and a left ear of the person according to the first distance signal;

obtaining a second distance between the right receiver and a right ear of the person according to the second distance signal; and executing a specific operation of the electronic device according to the first distance and the second distance.

14. The non-transitory computer-readable medium of claim 13, wherein the left distance signal comprises a value which indicates the first distance between the left receiver and the left ear of the person, and the right distance signal comprises a value which indicates the second distance between the right receiver and the right ear of the person.

15. The non-transitory computer-readable medium of claim 13, wherein the specific operation comprises a first operation, a second operation and a third operation.

16. The non-transitory computer-readable medium of claim 15, wherein the first operation is executed when the first distance and the second distance are equal to zero, the first operation is that the electronic device plays the multi-media files, or the electronic device starts communication function.

17. The non-transitory computer-readable medium of claim 15, wherein the second operation is executed when one of the first distance and the second distance is equal to zero, the second operation is that the electronic device turns up a volume of the left receiver to a predetermined volume when the first distance is equal to zero, and turns up a volume of the right receiver to the predetermined volume when the second distance is equal to zero.

18. The non-transitory computer-readable medium of claim 15, wherein the third operation is executed when the first distance and the second distance are not equal to zero, the third operation is that the electronic device is shut down or the electronic device turns on a speaker of the electronic device.

* * * * *

UNITED STATES PATENT AND TRADEMARK OFFICE
CERTIFICATE OF CORRECTION

PATENT NO. : 10,129,382 B2
APPLICATION NO. : 14/840286
DATED : November 13, 2018
INVENTOR(S) : Chih-Hao Chang Page 1 of 1

It is certified that error appears in the above-identified patent and that said Letters Patent is hereby corrected as shown below:

On the Title Page

Please replace item (30) regarding "Foreign Application Priority Data" with the following:
(30) Foreign Application Priority Data
Dec 30, 2014 (TW).............. 103146316

Signed and Sealed this
Thirty-first Day of December, 2019

Andrei Iancu
*Director of the United States Patent and Trademark Office*